(12) United States Patent
Mori

(10) Patent No.: US 8,448,889 B2
(45) Date of Patent: May 28, 2013

(54) WEBBING TAKE-UP DEVICE

(75) Inventor: Shinji Mori, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 305 days.

(21) Appl. No.: 12/956,619

(22) Filed: Nov. 30, 2010

(65) Prior Publication Data
US 2011/0133012 A1 Jun. 9, 2011

(30) Foreign Application Priority Data

Dec. 4, 2009 (JP) ................................ 2009-276585

(51) Int. Cl.
*B60R 22/40* (2006.01)
(52) U.S. Cl.
USPC ...................... 242/384; 242/384.5; 242/384.6
(58) Field of Classification Search
USPC ..................... 242/384, 384.5, 384.6
See application file for complete search history.

(56) References Cited

U.S. PATENT DOCUMENTS

| 5,251,843 | A | * | 10/1993 | Kielwein et al. | 242/384.6 |
| 5,495,994 | A | * | 3/1996 | Rumpf et al. | 242/384.4 |
| 6,364,239 | B1 | * | 4/2002 | Jallot et al. | 242/384.4 |
| 2008/0230644 | A1 | * | 9/2008 | Clute et al. | 242/382.2 |

FOREIGN PATENT DOCUMENTS

JP 2008-24284 A 2/2008

* cited by examiner

*Primary Examiner* — Sang Kim
(74) *Attorney, Agent, or Firm* — Roberts Mlotkowski Safran & Cole, P.C.

(57) ABSTRACT

In a V-sensor of a webbing take-up device, concave portions are formed in supporting walls of a supporting member having a spring property, and peak ends of a rotating shaft of a sensor pawl gets into the concave portions, and the rotating shaft is thereby supported by the supporting walls. Cone-shaped concave portions come into contact by pressure with the cone-shaped peak ends of the rotating shaft due to the elasticity of the supporting walls, and therefore, when the rotating shaft attempts to be displaced in the axis direction thereof and in a direction orthogonal to the axis direction of the rotating shaft, the elasticity of the supporting walls withstand displacement of the rotating shaft. As a result, occurrence of a rattle of the rotating shaft, that is, the sensor pawl can be prevented or restrained.

15 Claims, 5 Drawing Sheets

WEBBING TAKE-UP DEVICE

CROSS-REFERENCE TO RELATED APPLICATION

This application claims priority under 35 USC 119 from Japanese Patent Application No. 2009-276585 filed Dec. 4, 2009, the disclosure of which is incorporated by reference herein.

BACKGROUND OF THE INVENTION

1. Field of the Invention

The present invention relates to a webbing take-up device in which a webbing belt that restrains a body of a vehicle occupant is taken up on a spool and is accommodated, and particular to a webbing take-up device which is equipped with a lock mechanism that regulates rotation of a spool in a direction in which the webbing is pulled out, at the time of a rapid deceleration of a vehicle.

2. Related Art

An acceleration sensor which constitutes a lock mechanism of a webbing take-up device disclosed in Japanese Patent Application Laid-Open (JP-A) No. 2008-24284 is equipped with a hard ball placed on a mounting portion. When a vehicle is brought into a state of a rapid deceleration, the hard ball moves by inertia, and goes up a concave curved surface or inclined surface, which is formed on a mounting portion of a sensor frame, so as to push up a sensor pawl. Further, the sensor pawl pushed up by the hard ball pushes up a connecting pawl provided in a sensor gear such that the connecting pawl is engaged with a ratchet gear formed in an outer peripheral portion of a V-gear.

The V-gear is connected via a torsion shaft to a spool in a state of being not capable of rotating relative to the spool, and therefore, when the spool rotates in a pull-out direction in the state in which the connecting pawl engages with the ratchet gear of the V-gear, the sensor gear also rotates in the pull-out direction. When the sensor gear rotates in the pull-out direction, a pressing portion of the sensor gear presses against the lock pawl so as to cause the lock pawl to mesh with the ratchet gear of a lock base, thereby regulating rotation of the lock base in the pull-out direction as well as rotation of the spool in the pull-out direction. Thus, a webbing belt is restrained from being pulled out from the spool.

In the acceleration sensor as described above, a rotating shaft of the sensor pawl is inserted in a bearing hole of the sensor frame, and the sensor pawl is supported by the sensor frame in a rotatable manner. If the inner diameter of the bearing hole into which the rotating shaft is inserted is not larger than the outer diameter of the rotating shaft, the rotating shaft (and the sensor pawl) cannot be smoothly rotated.

However, by making larger the inner diameter of the bearing hole than the outer diameter of the rotating shaft, rattle occurs in the rotating shaft and the sensor pawl, thereby resulting in generation of abnormal noise.

SUMMARY OF THE INVENTION

In view of the above-described circumstances, the present invention is to provide a webbing take-up device which can prevent or restrain occurrence of a rattle in a trigger member such as a sensor pawl in an acceleration sensor of a lock section.

According to a first aspect of the present invention, a webbing take-up device includes: a tube-shaped spool to which a base end side in a longitudinal direction of an elongated band-shaped webbing belt is connected, and which takes up the webbing belt from the base end side of the webbing belt by rotation thereof in a take-up direction; and a lock section that includes an acceleration sensor which is actuated in a case in which an acceleration at a time of a rapid deceleration of a vehicle is a predetermined value or more, and a lock section main body that is actuated by actuation of the acceleration sensor and that regulates rotation of the spool in a pull-out direction that is opposite to the take-up direction, wherein the acceleration sensor includes: an inertial mass body; a sensor frame on which the inertial mass body is placed, the sensor frame allowing inertial movement of the inertial mass body when the acceleration is the predetermined value or more; a trigger member that is provided at the sensor frame at the upper side of the inertial mass body, the trigger member being pushed up by the inertially moving inertial mass body to be rotated around a rotating shaft, and actuating the lock section main body by rotation thereof; and a supporting member that is provided at the sensor frame and that supports the rotating shaft in a rotatable manner by elastically press-contacting end portions of the rotating shaft which are at both sides in an axis direction of the rotating shaft to press the rotating shaft from the both sides.

In the webbing take-up device according to the first aspect of the invention, when a vehicle decelerates at an acceleration having a predetermined value or more, an inertial mass body on a sensor frame that constitutes an acceleration sensor moves. When the inertial mass body moves as described above, a trigger member is pushed up by the inertial mass body and the trigger member rotates with a support position in a supporting member being as a rotation center. When the trigger member rotates in this manner, a lock member main body which constitutes a lock member together with the acceleration sensor is actuated, and rotation of a spool in a pull-out direction opposite to the above-described take-up direction is regulated by the actuated lock member main body.

In the acceleration sensor of the webbing take-up device according to the invention, the supporting member which supports the trigger member supports the rotating shaft of the trigger member by elastically press-contacting end portions of the rotating shaft which are at both sides in an axis direction of the rotating shaft to press the rotating shaft from the both sides. For this reason, displacement of the rotating shaft in the axial direction thereof, that is, occurrence of a rattle of the trigger member oriented as described above can be prevented or effectively restrained.

According to a second aspect of the present invention, in the first aspect of the invention, an outer diameter dimension of each of the end portions of the rotating shaft is made gradually smaller toward a tip end thereof, substantially cone-shaped concave portions are formed in the supporting member so as to correspond to the end portions of the rotating shaft respectively, an open diameter dimension of each concave portion is made gradually larger toward an opening thereof from a bottom portion thereof, and the end portion of the rotating shaft enters the concave portion, and the bottom portion of the concave portion press-contacts the end portion of the rotating shaft.

In the webbing take-up device according to the second aspect of the invention, each end portion of the rotating shaft of the trigger member, with the outer diameter dimension of the end portion becoming smaller gradually (little by little) toward the peak end side thereof, gets into inside of each cone-shaped concave portion, and the rotating shaft is supported by the concave portions. Displacement of the supported rotating shaft in the axial direction thereof is regulated by the supporting member elastically coming into contact by pressure with the rotating shaft from both end sides thereof in the axial direction of the rotating shaft. Further, if the rotating shaft attempts to be displaced in a direction orthogonal to the axial direction of the rotating shaft, the inner peripheral portion of the concave portion interferes with the end portion of the rotating shaft and its neighboring portion. As a result, occurrence of a rattle of the trigger member in the direction orthogonal to the axial direction of the rotating shaft can be prevented or retrained.

Further, it is possible that the end portion of the rotating shaft is substantially cone-shaped, and an angle of a tip end portion of each end portion of the rotating shaft is equal to or smaller than an open angle of the bottom portion of the concave portion.

Further, it is possible that the concave portions are respectively formed in supporting walls which constitute the supporting member and are provided so as to oppose each other along the axis direction of the rotating shaft.

According to a third aspect of the present invention, in the first or second aspect of the invention, the webbing take-up device further includes an interference member formed in the sensor frame, wherein when the trigger member is displaced in a direction orthogonal to the axis direction of the rotating shaft due to a load of a predetermined value or more being imparted to the trigger member, the interference member interferes with the outer peripheral portion of the rotating shaft and receives the load, thereby regulating displacement of the trigger member.

In the webbing take-up device according to the third aspect of the invention, for example, when the trigger member rotates to actuate the lock member main body, if the trigger member is forcibly displaced in a direction orthogonal to the axial direction of the rotating shaft due to a load receiving at the trigger member from the lock member main body exceeding a predetermined value, an interference member formed in the sensor frame interferes with an outer peripheral portion of the rotating shaft, and the load imparted to the trigger member is taken (received) by the interference member. As a result, displacement of the trigger member is restrained.

Further, it is possible that interference walls constitute the interference member, the interference walls being provided at the sensor frame so as to oppose each other along the axis direction of the rotating shaft, and hole portions through which the end portions of the rotating shaft respectively pass are formed in the interference walls respectively.

Further, it is possible that the sensor frame and the supporting member are separate members, and supporting walls, which constitute the supporting member and are provided so as to oppose each other along the axis direction of the rotating shaft, are respectively provided at outer sides of the interference walls in the axis direction of the rotating shaft.

According to a fourth aspect of the present invention, a webbing take-up device includes: a tube-shaped spool to which a base end side in a longitudinal direction of an elongated band-shaped webbing belt is connected, and which takes up the webbing belt from the base end side of the webbing belt by rotation thereof in a take-up direction; and a lock section that includes an acceleration sensor which is actuated in a case in which an acceleration at a time of a rapid deceleration of a vehicle is a predetermined value or more, and a lock section main body that is actuated by actuation of the acceleration sensor and that regulates rotation of the spool in a pull-out direction that is opposite to the take-up direction, wherein the acceleration sensor includes: an inertial mass body; a sensor frame on which the inertial mass body is placed, the sensor frame allowing inertial movement of the inertial mass body when the acceleration is the predetermined value or more; a trigger member that is provided at the sensor frame at the upper side of the inertial mass body, the trigger member being pushed up by the inertially moving inertial mass body to be rotated around a rotating shaft, and actuating the lock section main body by rotation thereof; a supporting member that is a separate member from the sensor frame and is provided at the sensor frame and that supports the rotating shaft in a rotatable manner by elastically press-contacting end portions of the rotating shaft which are at both sides in an axis direction of the rotating shaft to press the rotating shaft from the both sides; and an interference member formed in the sensor frame, wherein when the trigger member is displaced in a direction orthogonal to the axis direction of the rotating shaft due to a load of a predetermined value or more being imparted to the trigger member, the interference member interferes with the outer peripheral portion of the rotating shaft and receives the load, thereby regulating displacement of the trigger member.

In the webbing take-up device according to the fourth aspect of the invention, it is possible to obtain the effects similar to those of the first aspect and the third aspects.

As described above, the webbing take-up device according to the present invention makes it possible to prevent or effectively restrain occurrence of a rattle in the trigger member of the acceleration sensor.

BRIEF DESCRIPTION OF THE DRAWINGS

Embodiments of the invention will be described in detail with reference to the following figures, wherein.

DETAILED DESCRIPTION OF THE INVENTION

<Construction of the Present Exemplary Embodiment>

Figure 1:
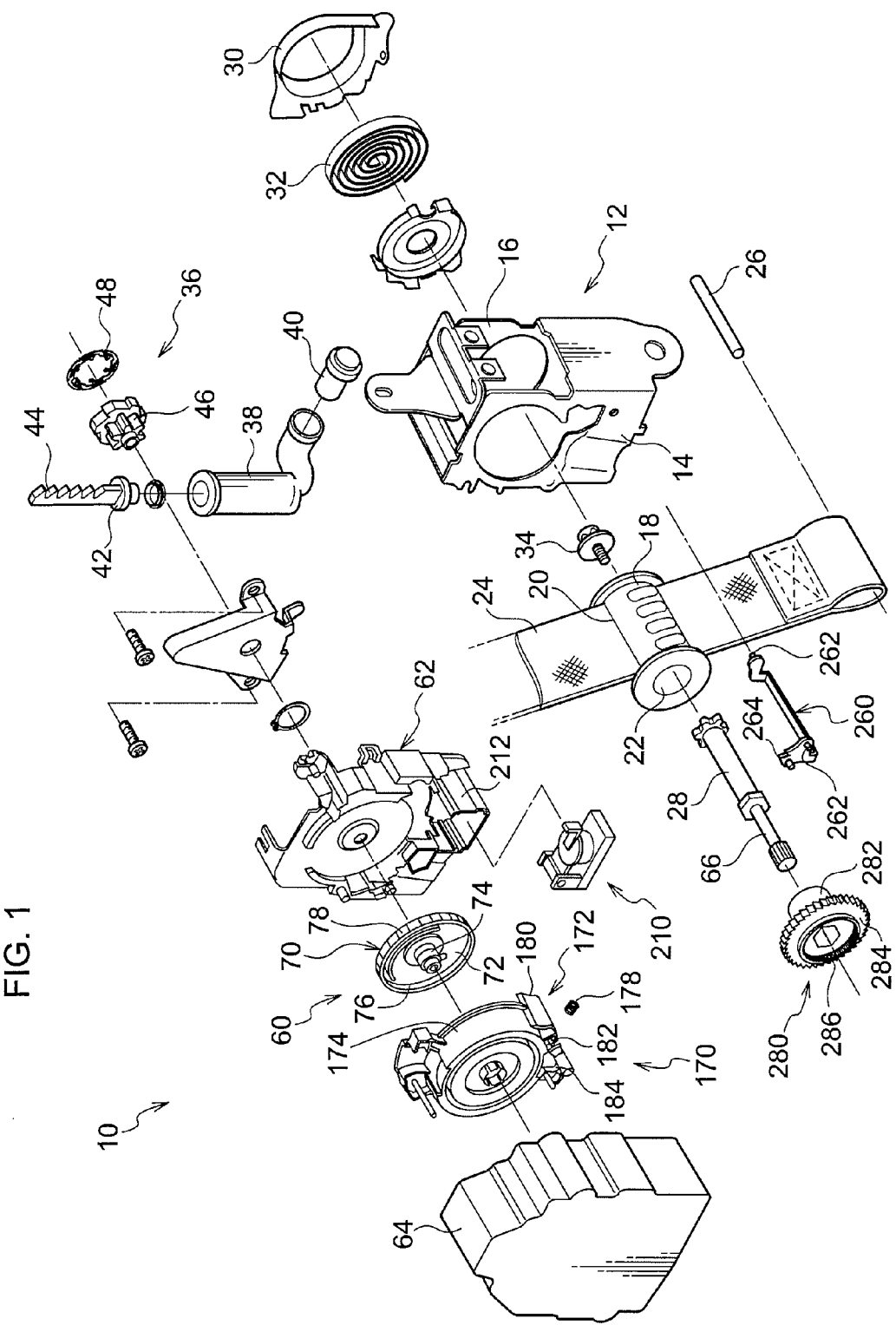
FIG. 1 is an exploded perspective view schematically showing an overall construction of a webbing take-up device 10 according to an exemplary embodiment of the present invention.

FIG. 1 shows an exploded perspective view which schematically shows an overall construction of a webbing take-up device 10 according to an exemplary embodiment of the present invention. As shown in this figure, the webbing take-up device 10 includes a frame 12. The frame 12 includes, for example, a pair of leg plates 14 and 16 which face each other substantially in the front-back direction of the vehicle. A spool 18 is provided between the leg plates 14 and 16. The spool 18 is formed into a tube whose axial direction extends along the direction in which the leg plates 14 and 16 face each other. An insertion hole 20 is formed in the spool 18. Both ends of the insertion hole 20 are each opened at the outer peripheral portions of the spool 18, and the opening shape of the insertion hole 20 is formed as a slit whose longitudinal direction is along the axial direction of the spool 18.

The insertion hole 20 is formed so as to avoid a through hole 22 passing through a shaft center portion of the spool 18, and a longitudinal direction base end side of an elongated band-shaped webbing belt 24 passes through the insertion hole 20 from one end thereof and is prevented from being pulled out by a retaining shaft 26. When the spool 18 rotates in a take-up direction which is one direction around the shaft thereof, the webbing belt 24 is taken up on the outer peripheral portion of the spool 18 in layers and is accommodated.

A rod-shaped torsion shaft 28 is provided at the inner side of the above-described through hole 22. An end portion of the torsion shaft 28 at the side of the leg plate 16 is connected to the spool 18 in the state of being prevented from rotating with respect to the spool 18 in the through hole 22 (that is, the state in which the torsion shaft 28 is not capable of rotating relatively with respect to the spool 18). Further, the end portion of the torsion shaft 28 at the side of the leg plate 16 passes through the leg plate 16 and projects outside of the frame 12.

A box-shaped spring cover 30 that is open toward the leg plate 16 is fixed to the leg plate 16 at the outer side of the leg plate 16, and the end portion of the torsion shaft 28 at the side of the leg plate 16 gets in the inside of the spring cover 30. An outer end portion of a spiral spring 32 in the spiral direction is engaged in and fastened to the spring cover 30. An inner end portion of the spiral spring 32 in the spiral direction is mounted at the end portion of the torsion shaft 28 at the side of the leg plate 16, and is engaged with and fastened to an adapter 34 which is rotatably supported by the spring cover 30 coaxially with respect to the through hole 22.

A pretensioner 36 is provided outside of the leg plate 14. The pretensioner 36 includes a cylinder 38. A gas generator 40 is mounted at an opening portion at the base end side of the cylinder 38, and when the internal pressure of the cylinder 38 increases due to the pressure of gas generated by actuation of the gas generator 40, a piston 42 disposed within the cylinder 38 moves along an axis direction of the cylinder 38, and a rack bar 44 integrated with the piston 42 rotates a pinion 46 in the take-up direction. When the pinion 46 rotates in the take-up direction, a lock base 280, which is described later, is rotated in the take-up direction via a clutch 48.

Further, a lock mechanism 60 is provided at the lateral side of the leg plate 14. The lock mechanism 60 includes a sensor holder 62. The sensor holder 62 is partially formed into a concave shape to open toward the side of the leg plate 14, and is fixed to the leg plate 14. A sensor cover 64 is provided at the side of the sensor holder 62 opposite to the side at which the leg plate 14 is disposed. Fitting pawls or the like are formed in the outer peripheral portion of the sensor cover 64, and are fit in predetermined positions of the sensor holder 62, and the sensor cover 64 is thereby mechanically connected to the sensor holder 62. In the sensor cover 64, a tube-shaped bearing (shaft-receiving) portion (not shown) is formed, and a shaft portion 66 extending from the other end portion of the torsion shaft 28 passing through the sensor holder 62 in a coaxial manner with respect to the torsion shaft 28 is rotatably supported by the bearing portion.

Further, a V-gear 70 is provided between the sensor holder 62 and the sensor cover 64. The V-gear 70 includes a circular plate portion 72 whose outer peripheral shape is circular. A circular hole is formed at the radial direction center of the circular plate portion 72, and a tube-shaped boss 74 is formed on the surface of the circular plate portion 72 at the side of the sensor cover 64 correspondingly to the circular hole in such a manner as to be coaxial with the circular hole of the circular plate portion 72. The above-descried shaft portion 66 (that is, the torsion shaft 28) passes through the circular hole formed in the circular plate portion 72, and also through the boss 74, and the circular plate portion 72 (that is, the V-gear 70) is supported around the shaft portion 66 in a rotatable manner. Further, a peripheral wall 76 is made upright from the outer peripheral portion of the circular plate portion 72 at least to the side of the sensor holder 62 along the axial direction of the circular plate portion 72. The peripheral wall 76 is formed into a cylinder that is coaxial with the circular plate portion 72, and plural ratchet teeth 78 are formed in the outer peripheral portion of the peripheral wall 76 at regular intervals around the center of the peripheral wall 76.

A sensor gear 172 that constitutes a lock mechanism main body 170 serving as a lock section main body is provided at the side of the V-gear 70 opposite to that the sensor holder 62 is disposed. The sensor gear 172 includes a sensor gear main body 174. The sensor gear main body 174 is formed substantially into a cylinder with a bottom having a shallow bottomed structure, which is opened toward the side of the V-gear 70. The shaft portion 66 of the torsion shaft 28 passes through the sensor gear main body 174 coaxially with each other, and the sensor gear main body 174 is supported by the shaft portion 66 in a freely rotatable manner.

Further, one end of a return spring 178 is engaged with and fastened to a portion of the sensor gear 172. The return spring 178 is formed as an extension coil spring, and the other end of the spring is engaged with and fastened to the sensor cover 64, and when the sensor gear 172 rotates around the torsion shaft 28 in the pull-out direction, the return spring urges the sensor gear 172 in the take-up direction.

A longitudinal pressing portion 180 is formed in the sensor gear main body 174 of the sensor gear 172 so as to be directed to the V-gear 70 side. A shaft 182 is formed so as to project from the end portion of the pressing portion 180 opposite to the side at which the V-gear 70 is disposed, and a connecting pawl 184 serving as a connecting member is supported by the shaft 182 in such a manner as to be rotatable around the axis parallel to (along the same direction as) the axial direction of the torsion shaft 28. The connecting pawl 184 rotates and thereby moves close to or away from the outer peripheral portion of the above-described peripheral wall 76, and as long as the V-gear 70 rotates in the pull-out direction in the state in which the connecting pawl 184 comes close to and engages with the ratchet teeth 78, rotation of the V-gear 70 in the pull-out direction is transmitted to the sensor gear 172 via the connecting pawl 184, and the sensor gear 172 rotates in the pull-out direction together with the V-gear 70.

Further, a V-sensor 210 serving as an acceleration sensor is provided below the connecting pawl 184. A box-shaped accommodating portion 212 that is opened toward the sensor cover 64 is formed in the sensor holder 62 so as to correspond to the V-sensor 210, and at least a portion of the V-sensor 210 is accommodated in the accommodating portion 212.

Figure 2:
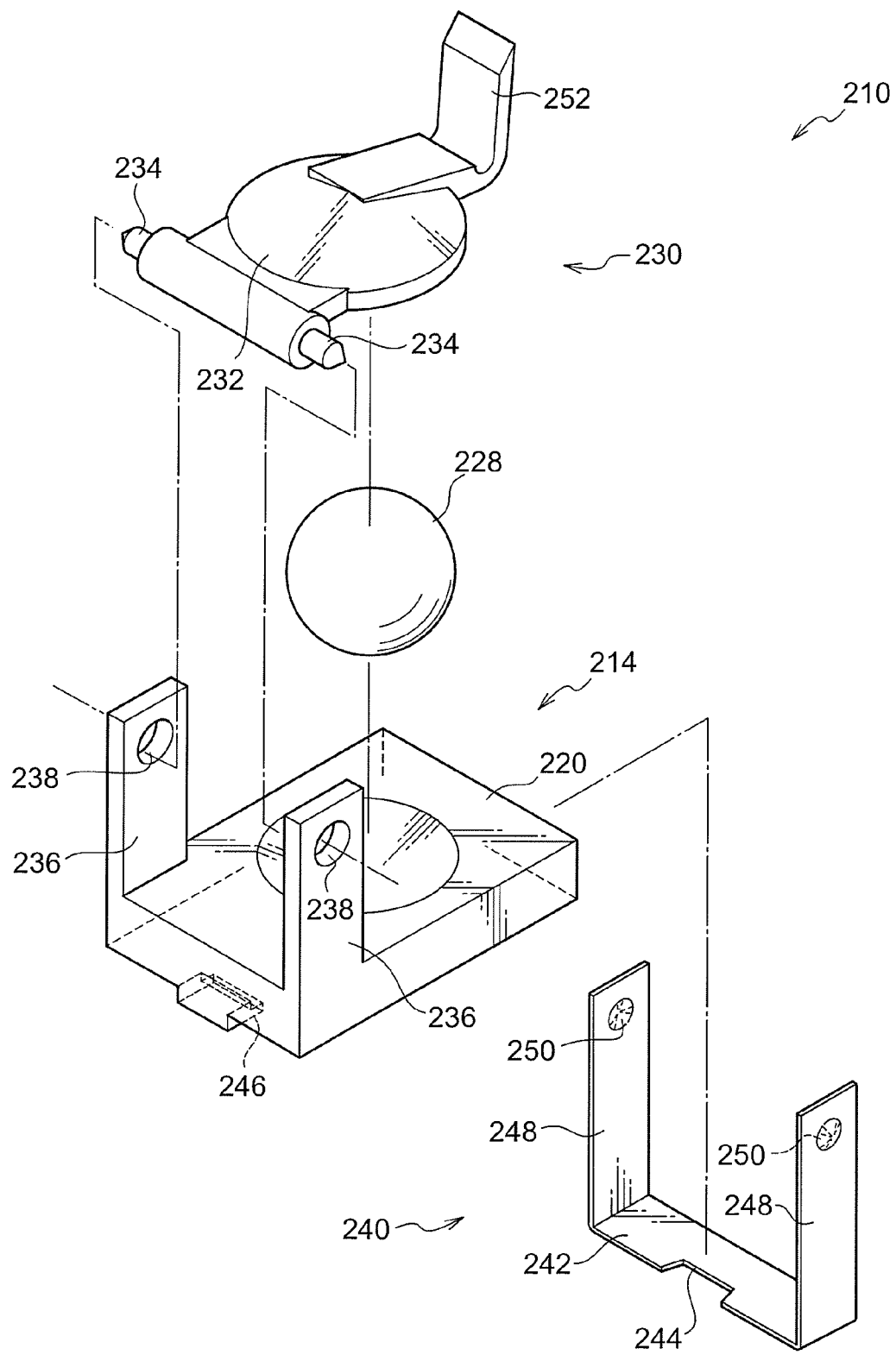
FIG. 2 is an exploded perspective view showing a construction of an acceleration sensor of the webbing take-up device according to an exemplary embodiment of the present invention.
Figure 3:
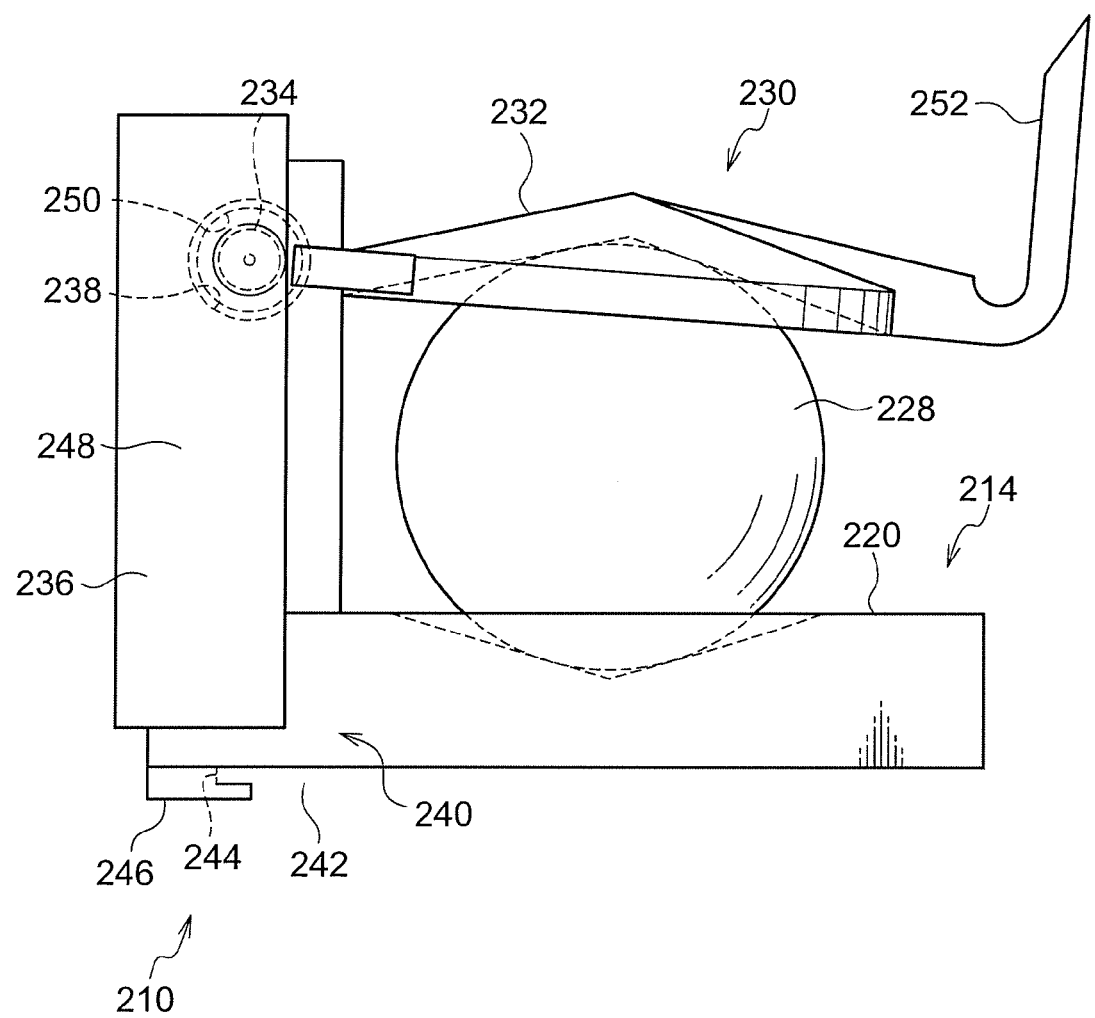
FIG. 3 is a side view of an acceleration sensor.
Figure 4:
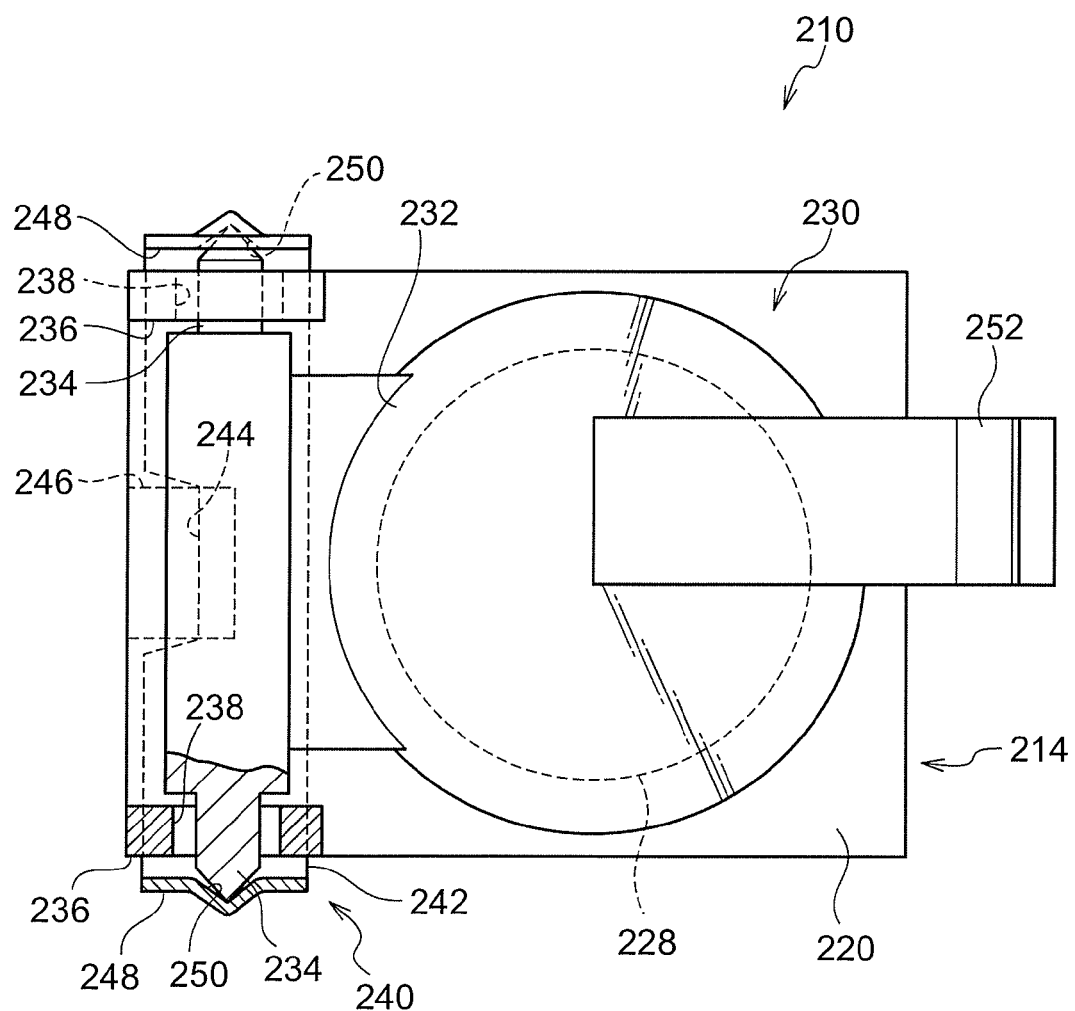
FIG. 4 is a plan view of an acceleration sensor.
Figure 5:
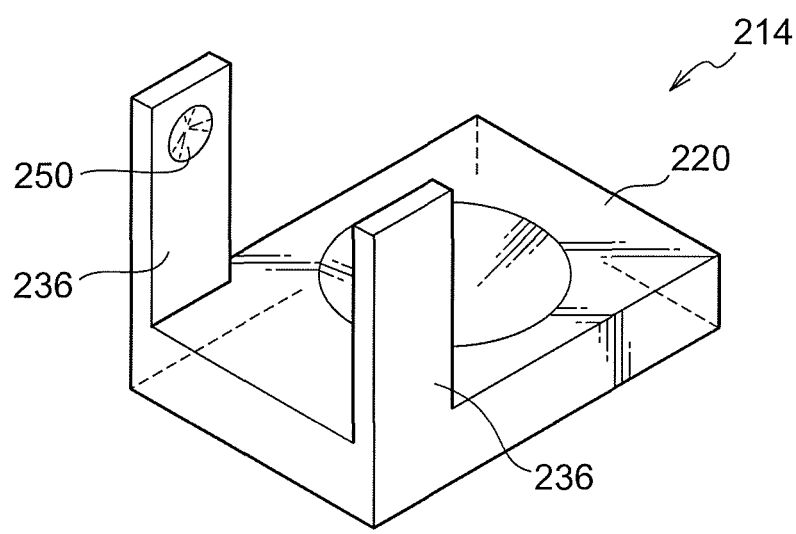
FIG. 5 is a perspective view showing a construction of a sensor frame of an acceleration sensor of the webbing take-up device according to another exemplary embodiment of the present invention.

As shown in FIG. 2 through FIG. 4, the V-sensor 210 includes a sensor frame 214. The sensor frame 214 is provided with a mounting portion 220. In the mounting portion 220, a concave curved surface that is curved with a predetermined position substantially at the upper side of a vehicle serving as the center of curvature, or a cone-shaped inclined surface that is opened upward, is formed. A hard ball 228 serving as an inertial mass body of the V-sensor 210 is placed on the curved surface or the inclined surface. A sensor pawl 230 serving as a trigger member is provided above the hard ball 228.

The sensor pawl 230 includes a base portion 232. The base portion 232 is provided with a pair of rotating shafts 234. These rotating shafts 234 are disposed coaxially with each other and are formed so as to project from the base portion 232 substantially in parallel to the mounting portion 220 in opposite directions correspondingly to the mounting portion 220. The sensor frame 214 includes a pair of interference walls 236 which correspond to the rotating shafts 234, respectively. The interference walls 236 are made upright from the both ends, which are at the projecting direction sides of the rotating shafts 234 extending from the base portion 232, of the mounting portion 220 toward the upper side. These interference walls 236 each include an interference hole 238. The interference hole 238 passes through the corresponding interference wall 236 along the axial direction of the rotating shaft 234. The inner diameter of the interference hole 238 is larger than the outer diameter of the rotating shaft 234, and the rotating shaft 234 passes through the interference hole 238.

Further, the sensor frame 214 is provided with a supporting member 240 which corresponds to the rotating shafts 234 passing through the interference holes 238. The supporting member 240 is globally formed by bending a metal flat plate which is elastically deformable around an axis whose axial direction is a direction orthogonal to the direction of plate thickness. The supporting member 240 includes a base portion 242 which is disposed below the mounting portion 220.

A notch portion 244 is formed substantially at the center portion of the base portion 242 along the axial direction of the rotating shafts 234. A positioning projection 246 is formed so as to project from the lower surface of the mounting portion 220 in such a manner as to correspond to the notch portion 244, and in the state in which the base portion 242 is disposed below the mounting portion 220, the positioning projection 246 gets into the inside of the notch portion 244. When the base portion 242 attempts to be displaced in the axial direction of the rotating shafts 234 or to the open direction side of the notch portion 244 with respect to the mounting portion 220, the positioning projection 246 interferes with the inner peripheral portion of the notch portion 244 so as to regulate displacement of the base portion 242.

Supporting walls 248 are made upright so as to extend respectively from both ends, along the axial direction of the rotating shafts 234, of the base portion 242. These supporting walls 248 are made upright along the interference walls 236, respectively, at the outer sides of the interference walls 236. In each of the supporting walls 248, a concave portion 250 is formed so as to correspond to the rotating shaft 234. The concave portion 250 is formed as a cone-shaped dent which is opened to the interference wall 236 side and whose inner diameter dimension becomes small gradually toward the bottom thereof. The concave portion 250 of one of the supporting walls 248 and the concave portion 250 of the other supporting wall 248 are formed so as to be substantially coaxial with each other.

Each of the distal end side of the rotating shaft 234 is formed so as to have a cone-shaped configuration, with the outer diameter dimension thereof becomes smaller gradually toward the peak (tip) end thereof, in such a manner as to correspond to the concave portion 250. The angle of a cone-shaped portion (the tip end (peak end)) of the rotating shaft 234 is made smaller than an open angle (at the bottom of the concave portion 250) of the cross-sectional configuration of the concave portion 250 (see FIG. 4). The peak end portion of the rotating shaft 234 enters into the inside of the concave portion 250, and the bottom (the top-most portion of the cone) of the concave portion 250 comes into contact by pressure with the peak end of the rotating shaft 234 due to elasticity of the supporting wall 248 with the base end (the lower end) of the supporting wall 248 being centered.

Namely, in the embodiment, in a state where the supporting walls 248 support the rotating shaft 234, the rotating shaft 234 is pushed or pressed, form the both sides, in the axial direction by the supporting walls 248 which can impart pressing or pushing force in the axial direction due to the elasticity (spring property) thereof.

A claw portion 252 is formed in the base portion 232 at the side opposite to the side at which the rotating shafts 234 are formed. When the sensor pawl 230 rotates around the rotating shaft 234 so as to move upward, the claw portion 252 abuts against the connecting pawl 184 so as to rotate and push up the connecting pawl 184. The above-described V-gear 70 is positioned at the rotating direction side of the connecting pawl 184 that is rotated by engaging with the claw portion 252, whereby the connecting pawl 184 engages with the ratchet teeth 78 of the V-gear 70.

As shown in FIG. 1, the lock mechanism 60 includes a lock pawl 260 serving as a lock member. The lock pawl 260 includes a pair of shafts 262. The axial direction of the shafts 262 coincides with a direction parallel to or along the axial direction of the spool 18. The distal end side of one of the shafts 262 is rotatably supported by a bearing hole (not shown) formed in the leg plate 16, and the distal end side of the other of the shafts 262 is rotatably supported by the sensor holder 62. A pawl portion 264 is formed at the other shaft 262 side. The pawl portion 264 is a plate-like member whose thickness direction coincides with the axial direction of the shaft 262, and an external-tooth ratchet tooth is formed partially on the outer periphery thereof.

A lock base 280 is provided at the lateral side of the pawl portion 264 along the rotation radial direction of the shaft 262. The lock base 280 includes a fit-insertion portion 282. The fit-insertion portion 282 is formed into a circular column, and is rotatably fit and inserted in the other end portion of the through hole 22 of the spool 18 in such a manner as to be coaxial with the spool 18. The torsion shaft 28 passes through the fit-insertion portion 282 and also through the lock base 280 coaxially with each other in the state of being stopped from rotating, and the lock base 280 rotates coaxially with and integrally with the torsion shaft 28. A ratchet portion 284 is formed integrally with the fit-insertion portion 282 at the side of the leg plate 14. A ratchet portion 284 is formed coaxially with the fit-insertion portion 282, and ratchet teeth are formed intermittently in the outer peripheral portion of the ratchet portion 284.

In the above-described lock pawl 260, due to the shafts 262 rotating in the take-up direction, the ratchet tooth of the pawl portion 264 engages with the ratchet teeth of the ratchet portion 284. In the state in which the pawl portion 264 and the ratchet portion 284 engage with each other, rotation of the ratchet portion 284 as well as the lock base 280 in the pull-out direction is regulated. Further, the pressing portion 180 of the sensor gear 172 shown in FIG. 1 corresponds to the pawl portion 264, and when the sensor gear main body 174 of the sensor gear 172 rotates in the pull-out direction, the pressing portion 180 presses against the pawl portion 264 so as to rotate the lock pawl 260 in the take-up direction.

Further, a clutch hole 286 is formed so as to open on an end surface of the lock base 280 at the side opposite to the side at which the fit-insertion portion 282 of the ratchet portion 284 is disposed, and the torsion shaft 28 passes through the clutch hole 286. When the clutch 48 rotates in the take-up direction accompanied by the pinion 46 in the take-up direction, a part of the clutch 48 engages with the inner peripheral portion of the clutch hole 286 so as to rotate the lock base 280 in the take-up direction.

<Operation and Effects of the Present Exemplary Embodiment>

Next, the basic operation, function and effects of the present webbing take-up device 10 are described.

In the present webbing take-up device 10, when the webbing belt 24 in the state of being taken up on the spool 18 is pulled out toward the leading end thereof against the urging force of the spiral spring 32, the spool 18 rotates in the pull-out direction while the webbing belt 24 is being pulled out. The webbing belt 24 pulled out in the above-described manner is overlaid (put) on the body of a vehicle occupant, for example, a tongue plate provided at the longitudinal direction intermediate portion of the webbing belt 24 is held in a buckle device provided at the lateral side of the a vehicle seat, whereby the webbing belt 24 is brought into a state of being applied to the body of a vehicle occupant, and the body of the vehicle occupant is restrained by the webbing belt 24.

When a vehicle is brought into the state of a rapid deceleration in the state in which the webbing belt 24 is applied to the occupant, the hard ball 228 on the mounting portion 220 moves by inertia. The hard ball 228 moving by inertia ascends the curved surface or inclined surface of the mounting portion 220, so as to push up the base portion 232 of the sensor pawl 230 from the lower side. The sensor pawl 230 pushed up in this manner rotates around the rotating shafts 234 and moves up the claw portion 252. The claw portion 252 moved up in this manner engages with the connecting pawl 184 of the sensor gear 172 and rotates, so as to push up, the connecting pawl 184. As a result, the connecting pawl 184 meshes with the ratchet teeth 78 that constitute the V-gear 70.

When the V-gear 70 rotates in the pull-out direction in the state in which the connecting pawl 184 engages with the ratchet teeth 78 of the V-gear 70, rotation of the V-gear 70 is transmitted to the sensor gear 172, and the sensor gear 172 rotates in the pull-out direction together with the V-gear 70 against the urging force of the return spring 178. When the sensor gear 172 rotates in the pull-out direction by a predetermined angle, the pressing portion 180 provided in the sensor gear 172 presses against the pawl portion 264 of the lock pawl 260, and the pawl portion 264 is rotated around the shaft 262.

When the pawl portion 264 rotates around the shaft 262 in the above-described manner, the pawl portion 264 meshes with the ratchet portion 284 of the lock base 280, so as to regulate rotation of the lock base 280 as well as the spool 18 in the pull-out direction. As a result, the body of a vehicle occupant who attempts to move by inertia substantially to the front side of a vehicle can be reliably restrained and held by the webbing belt 24.

Here, in the V-sensor 210 of the webbing take-up device 10, the concave portions 250 respectively formed in the supporting walls 248 of the supporting member 240 come into contact by pressure with the peak ends of the rotating shafts 234, respectively, by means of elasticity which is around the base end portions of the supporting walls 248. For this reason, in a case where the sensor pawl 230 attempts to displace in the axial direction of the rotating shafts 234, the elasticity of the supporting wall 248 (the supporting member 240) acts so as to withstand displacement of the sensor pawl 230.

Further, the inner diameter of the interference hole 238 of the interference wall 236 through which the rotating shaft 234 passes is larger than the outer diameter of the rotating shaft 234. For this reason, the rotating shaft 234 can be displaced in a direction orthogonal to the axial direction at the inner side of the interference hole 238. However, displacement of the rotating shaft 234 in the direction orthogonal to the axis direction causes the peak end of the rotating shaft 234 to slide toward the opening direction side of the concave portion 250 on the inner peripheral surface (the inclined surface) of the concave portion 250, so that the rotating shafts 234 push to widen the supporting walls 248.

The elasticity of the supporting walls 248 acts so as to withstand displacement of the rotating shafts 234 in this manner as well, that is, when the peak end of the rotating shaft 234 attempts to displace toward the open side of the concave portion 250 on the inclined surface of the concave portion 250, the elasticity of the supporting wall 248 causes the peak end of the rotating shaft 234 to be pushed back to the bottom side of the concave portion 250.

In this manner, in the present exemplary embodiment, due to the elasticity of the supporting walls 248 (the supporting member 240), displacement of the sensor pawl 230 in the axial direction of the rotating shafts 234 or in the direction orthogonal to the axial direction, that is to say, occurrence of a rattle of the sensor pawl 230 can be prevented or effectively restrained, and generation of abnormal noise caused by a rattle of the sensor pawl 230 can be prevented or effectively restrained.

On the other hand, when the connecting pawl 184 pushed up by the sensor pawl 230 meshes with the ratchet teeth 78 of the V-gear 70, the sensor gear 172 rotates accompanied by the V-gear 70. In this manner, when the sensor gear 172 rotates, the connecting pawl 184 presses against the sensor pawl 230 in the rotating direction thereof. If the pressing force exceeds a predetermined magnitude, the rotating shafts 234 are displaced accompanying with the supporting walls 248 in the direction orthogonal to the axis direction of the rotating shafts 234. When the rotating shafts 234 are displaced in this manner, the inner peripheral portions of the interference holes 238, which are respectively formed in the interference walls 236, interfere with the outer peripheral portions of the rotating shafts 234. As a result, the above-described pressing force imparted to the sensor pawl 230 is supported so that displacement of the rotating shafts 234 can be regulated.

In the present exemplary embodiment, the sensor frame 214 having the mounting portion 220 and the supporting member 240 having the supporting walls 248 in which the concave portions 250 are respectively formed are structured as separate members, but the present invention is not limited to this structure. Namely, a structure in which the supporting walls 248 that include the concave portions 250 formed therein, in place of the interference walls 236, are formed upright from the mounting portion 220 of the sensor frame 214 may be provided.

In a case in which the supporting walls 248 are formed upright from the mounting portion 220 as described above, for example, there may be provided a structure in which the supporting wall 248 may be formed from a metal piece or a synthetic resin piece which is elastically deformable around the axis thereof, with the widthwise direction of the piece coinciding with the axial direction, and the supporting wall 248 is made upright from the mounting portion 220 by attaching (sticking or applying) by means of insert molding use of adhesive or the like, or screwing or fitting-in in a fit-in concave portion or the like formed in the mounting portion 220.

Further, in the present exemplary embodiment, the structure in which the rotating shafts 234 pass through the interference holes 238 which are opened only at the thickness-direction both sides of the interference walls 236 is shown. However, the configuration of regions of the interferences walls 236 through which the rotating shafts 234 pass respectively is not limited to the interference holes 238 which are opened only at the thickness-direction both ends of the interference walls 236. Namely, the orientation to which the connecting pawl 184 presses against the sensor pawl 230 due to rotation of the sensor gear 172 is limited, and therefore, a region of the inner peripheral portion of the interference hole 238 which interferes with the outer peripheral portion of the rotating shaft 234 is accordingly limited.

For this reason, a part that does not make a contribution to interfering of the rotating shaft 234 therewith at the time of the above-described pressing occurring may be opened in the outer peripheral portion of the interference wall 236. If the structure in which the interference hole 238 is opened in the part of the outer peripheral portion of the interference wall 236 as described is provided, the rotating shaft 234 can be disposed at the inner side of the interference hole 238 from this opened portion of the interference hole 238, and therefore, there is the advantage that assembling would become facilitated.

What is claimed is:

1. A webbing take-up device comprising:
a tube-shaped spool to which a base end side in a longitudinal direction of an elongated band-shaped webbing belt is connected, and which takes up the webbing belt from the base end side of the webbing belt by rotation thereof in a take-up direction; and
a lock section that includes an acceleration sensor which is actuated in a case in which an acceleration at a time of a rapid deceleration of a vehicle is a predetermined value or more, and a lock section main body that is actuated by actuation of the acceleration sensor and that regulates rotation of the spool in a pull-out direction that is opposite to the take-up direction,
wherein the acceleration sensor includes:
an inertial mass body;
a sensor frame on which the inertial mass body is placed, the sensor frame allowing inertial movement of the inertial mass body when the acceleration is the predetermined value or more;
a trigger member that is provided at the sensor frame at the upper side of the inertial mass body, the trigger member being pushed up by the inertially moving inertial mass body to be rotated around a rotating shaft, and actuating the lock section main body by rotation thereof; and
a supporting member that is provided at the sensor frame and that supports the rotating shaft in a rotatable manner by elastically press-contacting end portions of the rotating shaft which are at both sides in an axis direction of the rotating shaft to press the rotating shaft from the both sides.

2. The webbing take-up device of claim 1, wherein
an outer diameter dimension of each of the end portions of the rotating shaft is made gradually smaller toward a tip end thereof,
substantially cone-shaped concave portions are formed in the supporting member so as to correspond to the end portions of the rotating shaft respectively,
an open diameter dimension of each concave portion is made gradually larger toward an opening thereof from a bottom portion thereof, and
the end portion of the rotating shaft enters the concave portion, and the bottom portion of the concave portion press-contacts the end portion of the rotating shaft.

3. The webbing take-up device of claim 2, further comprising an interference member formed in the sensor frame, wherein when the trigger member is displaced in a direction orthogonal to the axis direction of the rotating shaft due to a load of a predetermined value or more being imparted to the trigger member, the interference member interferes with the outer peripheral portion of the rotating shaft and receives the load, thereby regulating displacement of the trigger member.

4. The webbing take-up device of claim 3, wherein interference walls constitute the interference member, the interference walls being provided at the sensor frame so as to oppose each other along the axis direction of the rotating shaft, and hole portions through which the end portions of the rotating shaft respectively pass are formed in the interference walls respectively.

5. The webbing take-up device of claim 4, wherein
the sensor frame and the supporting member are separate members, and
supporting walls, which constitute the supporting member and are provided so as to oppose each other along the axis direction of the rotating shaft, are respectively provided at outer sides of the interference walls in the axis direction of the rotating shaft.

6. The webbing take-up device of claim 2, wherein
the end portion of the rotating shaft is substantially cone-shaped, and
an angle of a tip end portion of each end portion of the rotating shaft is equal to or smaller than an open angle of the bottom portion of the concave portion.

7. The webbing take-up device of claim 2, wherein the concave portions are respectively formed in supporting walls which constitute the supporting member and are provided so as to oppose each other along the axis direction of the rotating shaft.

8. The webbing take-up device of claim 1, further comprising an interference member formed in the sensor frame, wherein when the trigger member is displaced in a direction orthogonal to the axis direction of the rotating shaft due to a load of a predetermined value or more being imparted to the trigger member, the interference member interferes with the outer peripheral portion of the rotating shaft and receives the load, thereby regulating displacement of the trigger member.

9. The webbing take-up device of claim 1, wherein the supporting member supports the rotating shaft by elastically press-contacting tip ends of the rotating shaft which are at both sides in the axis direction of the rotating shaft to press the rotating shaft from both sides.

10. A webbing take-up device comprising:
a tube-shaped spool to which a base end side in a longitudinal direction of an elongated band-shaped webbing belt is connected, and which takes up the webbing belt from the base end side of the webbing belt by rotation thereof in a take-up direction; and
a lock section that includes an acceleration sensor which is actuated in a case in which an acceleration at a time of a rapid deceleration of a vehicle is a predetermined value or more, and a lock section main body that is actuated by actuation of the acceleration sensor and that regulates rotation of the spool in a pull-out direction that is opposite to the take-up direction,
wherein the acceleration sensor includes:
an inertial mass body;
a sensor frame on which the inertial mass body is placed, the sensor frame allowing inertial movement of the inertial mass body when the acceleration is the predetermined value or more;
a trigger member that is provided at the sensor frame at the upper side of the inertial mass body, the trigger member being pushed up by the inertially moving inertial mass body to be rotated around a rotating shaft, and actuating the lock section main body by rotation thereof;
a supporting member that is a separate member from the sensor frame and is provided at the sensor frame and that supports the rotating shaft in a rotatable manner by elastically press-contacting end portions of the rotating shaft which are at both sides in an axis direction of the rotating shaft to press the rotating shaft from the both sides; and
an interference member formed in the sensor frame, wherein when the trigger member is displaced in a direction orthogonal to the axis direction of the rotating shaft due to a load of a predetermined value or more being imparted to the trigger member, the interference member interferes with the outer peripheral portion of the rotating shaft and receives the load, thereby regulating displacement of the trigger member.

11. The webbing take-up device of claim 10, wherein
an outer diameter dimension of each of the end portions of the rotating shaft is made gradually smaller toward a tip end thereof,
substantially cone-shaped concave portions are formed in the supporting member so as to correspond to the end portions of the rotating shaft respectively,
an open diameter dimension of each concave portion is made gradually larger toward an opening thereof from a bottom portion thereof, and
the end portion of the rotating shaft enters in the concave portion, and the bottom portion of the concave portion press-contacts the end portion of the rotating shaft.

12. The webbing take-up device of claim 11, wherein
the end portion of the rotating shaft is substantially cone-shaped, and
an angle of a peak end portion of the end portion of the rotating shaft is equal to or smaller than an open angle of the bottom portion of the concave portion.

13. The webbing take-up device of claim 11, wherein the concave portions are respectively formed in supporting walls which constitute the supporting member and are provided so as to oppose each other along the axis direction of the rotating shaft.

14. The webbing take-up device of claim 11, wherein
interference walls constitute the interference member, the interference walls being provided at the sensor frame so as to oppose each other along the axis direction of the rotating shaft, and
hole portions through which the end portions of the rotating shaft respectively pass are formed in the interference walls respectively.

15. The webbing take-up device of claim 10, wherein the supporting member supports the rotating shaft by elastically press-contacting tip ends of the rotating shaft which are at both sides in the axis direction of the rotating shaft to press the rotating shaft from both sides.

\* \* \* \* \*